United States Patent
Bestfleisch et al.

(10) Patent No.: US 9,886,270 B2
(45) Date of Patent: Feb. 6, 2018

(54) LAYERED BUSINESS CONFIGURATION

(71) Applicants: Ulrich Bestfleisch, Schwetzingen (DE); Gregor Karl Frey, Lorsch (DE); Oliver Klemenz, Hoffenheim (DE); Udo Klein, Eggenstein-Leopoldshafen (DE)

(72) Inventors: Ulrich Bestfleisch, Schwetzingen (DE); Gregor Karl Frey, Lorsch (DE); Oliver Klemenz, Hoffenheim (DE); Udo Klein, Eggenstein-Leopoldshafen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 14/689,334

(22) Filed: Apr. 17, 2015

(65) Prior Publication Data
US 2016/0306628 A1    Oct. 20, 2016

(51) Int. Cl.
| | | |
|---|---|---|
| G06F 9/45 | (2006.01) | |
| G06F 9/44 | (2006.01) | |
| G06F 17/30 | (2006.01) | |
| G06F 9/445 | (2006.01) | |

(52) U.S. Cl.
CPC ............ *G06F 8/71* (2013.01); *G06F 9/44505* (2013.01); *G06F 17/30* (2013.01)

(58) Field of Classification Search
CPC .................................... G06F 8/24; G06F 8/30
See application file for complete search history.

(56) References Cited

U.S. PATENT DOCUMENTS

| | | | | |
|---|---|---|---|---|
| 7,793,255 | B1* | 9/2010 | Kawaguchi | G06F 8/24 717/100 |
| 7,926,049 | B1* | 4/2011 | Kumar | G06F 9/44505 717/170 |
| 2006/0195460 | A1* | 8/2006 | Nori | G06F 17/3056 |
| 2007/0282889 | A1* | 12/2007 | Ruan | G06F 8/24 |
| 2014/0122427 | A1* | 5/2014 | Dary | G06F 17/30575 707/620 |
| 2015/0127613 | A1* | 5/2015 | Tang | G06F 8/65 707/646 |

* cited by examiner

*Primary Examiner* — Li B Zhen
*Assistant Examiner* — Lenin Paulino
(74) *Attorney, Agent, or Firm* — Mintz Levin Cohn Ferris Glovsky and Popeo, P.C.

(57) ABSTRACT

A system, a method, and a computer program product for providing a layered business configuration are disclosed. A configuration information for configuring an application object of a software application is obtained. The configuration information is arranged in at least one configuration staging table. The configuration staging table contains at least one configuration object. The configuration object contained in the configuration staging table is activated. Based on the activated configuration object, at least one configuration runtime table for configuring the application object is generated.

20 Claims, 12 Drawing Sheets

| PACKAGE_ID | LAYER |
|---|---|
| company | 0 |
| partner1 | 1 |
| customer | 2 |

FIG. 4

Staging Table — 410

| PACKAGE_ID | CODE | COLUMN_1 | COLUMN_2 |
|---|---|---|---|
| company | company.CODE_1 | A | B |
| company | company.CODE_2 | C | D |
| partner1 | partner1.CODE_1 | X | Y |
| partner1 | company.CODE_1 | Q | W |
| customer | customer.CODE_4711 | A | B |

Runtime Table — 420

| CODE | COLUMN_1 | COLUMN_2 |
|---|---|---|
| company.CODE_1 | Q | W |
| company.CODE_2 | C | D |
| partner1.CODE_1 | X | Y |
| customer.CODE_4711 | A | B |

LAYERED BUSINESS CONFIGURATION

TECHNICAL FIELD

This disclosure relates generally to data processing and, in particular, to a layered business configuration for various software applications.

BACKGROUND

Businesses use a plurality of business process applications and/or services in their business operations. Applications and/or services can be programs that an end-user runs to accomplish certain tasks and can work in conjunction with one or more back-end systems, which can store the data to be worked on, such as, for example, business objects and other business data, as well as logic for manipulating the data, such as for example transactions or other business logic. Examples of back-end systems may include database systems, enterprise resource planning ("ERP") systems, and customer relationship management ("CRM") systems. A user interface ("UI") can be designed to work in concert with application programs, and facilitates interaction between humans and computers by inviting and responding to user input. In order to accomplish various tasks, a user can initiate various applications, tasks, agents, etc. that may manipulate data in different ways to achieve results desired by the user.

Users can design and/or create various business process objects, such as sales orders, invoices, etc. A business object can be created using any known computing systems and languages (e.g., one such exemplary language includes advanced business application programming ("ABAP") high level programming language, which is available from SAP SE, Walldorf, Germany). Such created objects can be stored in memory, such as in a database. An example of such database includes a High-Performance Analytic Appliance ("HANA"), which is a column-oriented, in-memory database appliance available from SAP SE, Walldorf, Germany.

However, conventional systems do not provide an efficient way of providing configuration and/or customization of business objects using various company, third-party, and/or user content. This can lead to increased operational and/or maintenance costs as well as decreased effectiveness of business systems.

SUMMARY

In some implementations, the current subject matter relates to a computer-implemented method for providing a layered business configuration. The method can include obtaining configuration information for configuring an application object of a software application. The configuration information can be arranged in at least one configuration staging table. The configuration staging table can contain at least one configuration object. The method can also include activating the configuration object contained in the configuration staging table and generating, based on the activated configuration object, at least one configuration runtime table for configuring the application object. At least one of the obtaining, the activating, and the generating can be performed by at least one processor of at least one computing system.

In some implementations, the current subject matter can include one or more of the following optional features. The configuration object can include identification of a plurality of sources of the configuration information. Each source in the plurality of source can contain at least one configuration setting for configuration of the application object. For example, a first source in the plurality of sources of the configuration information can contain a first configuration setting and a second source in the plurality of sources of the configuration information contains a second configuration setting information. The first configuration setting can overwrite the second configuration setting when performing configuration of the application object.

In some implementations, the method can include performing a consistency check of the at least one configuration object.

In some implementations, the configuration object can be an application object framework object. The application object framework object can contain at least one persistent application object and at least one operation. The operations can include at least one of the following: a create operation, a read operation, an update operation, a delete operation, a custom action operation, an existence of action check operation, and an operation on at least one property of the application object. The application object framework object can be also characterized by at least one of the following: an object definition, a definition of an application object node, a definition of an application object root node, a definition of an application object node attribute, a definition of an application object action, and a definition of an application object authorization.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIG. 3 illustrates an exemplary table identifying hierarchy or layering of packages that can be originating from a company providing the application, a third party (e.g., a partner), and a user, according some implementations of the current subject matter;

FIG. 4 illustrates exemplary staging table and runtime table, according to some implementations of the current subject matter;

DETAILED DESCRIPTION

In some implementations, the current subject matter relates to providing layered business configuration to software applications. The current subject matter can provide configurability to software application packages by delivering various content (e.g., tables, data, etc.) using various software delivery mechanisms. Further, the current subject matter can also deliver such configurability to business objects, business processes, business process applications, and/or any other data. The layered business configuration can be operable using High Performance Analytic Appliance ("HANA") system as developed by SAP SE, Walldorf, Germany. In some implementations, the current subject matter can implement an application object framework (as described in co-owned, co-pending U.S. patent application Ser. No. 14/689,920, entitled "Application Object Framework", now U.S. Pat. No. 9,600,299, issued Mar. 21, 2017, the disclosure of which is incorporated herein by reference in its entirety), which discussed below, for the purposes of delivering configuration content. The application object framework can provide access to create, read, update and delete ("CRUD") operations and associated business processes.

Business applications typically demand a high grade of flexibility as users execute processes differently and adapt software applications to user's preferences. In some cases, it may not be possible to deliver a software application to a user that is ready to be executed in accordance with user's specific preferences. Thus, a customization of the software application may be required. The current subject matter can provide an interface that can provide an on-the-fly configuration capability to configure/customize the software application and/or any associated hardware and/or software.

Figure 1:
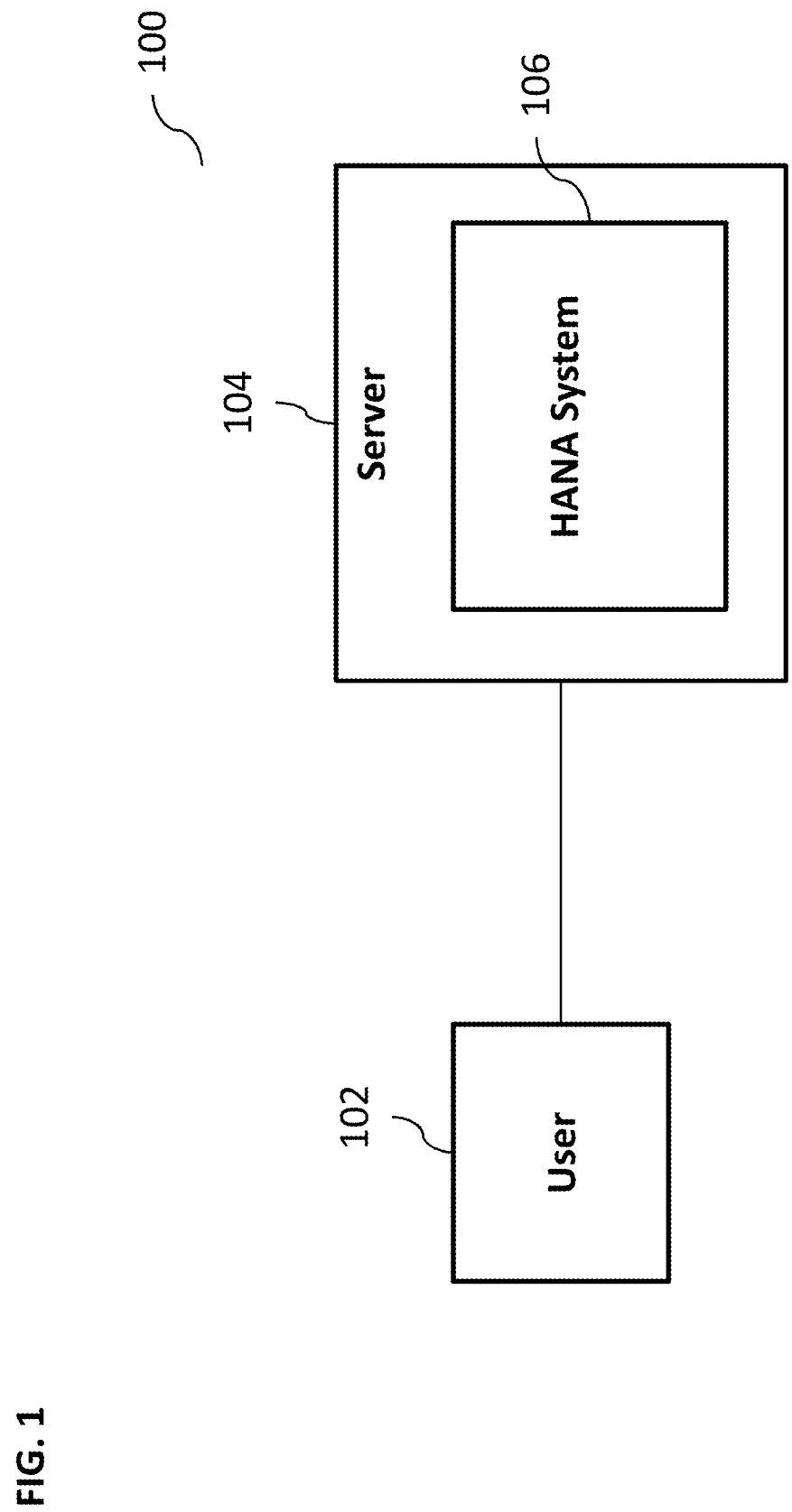
FIG. 1 illustrates an exemplary system that can provide configuration/customization capability for configuring/customizing an application, according to some implementations of the current subject matter.

FIG. 1 illustrates an exemplary system 100 that can provide configuration/customization capability for configuring/customizing an application, according to some implementations of the current subject matter. The system 100 can include a user 102 communicating with a server 104. The server 104 can include hardware, software, and/or any combination thereof that can support operation of a high performance analytic appliance ("HANA") system 106. An application object framework (not shown in FIG. 1) can be also included in the HANA system 106. The user 102 can be a local client user, a remote user, an application, a business object, a business process, a business process application, and/or any other user.

Figure 2:
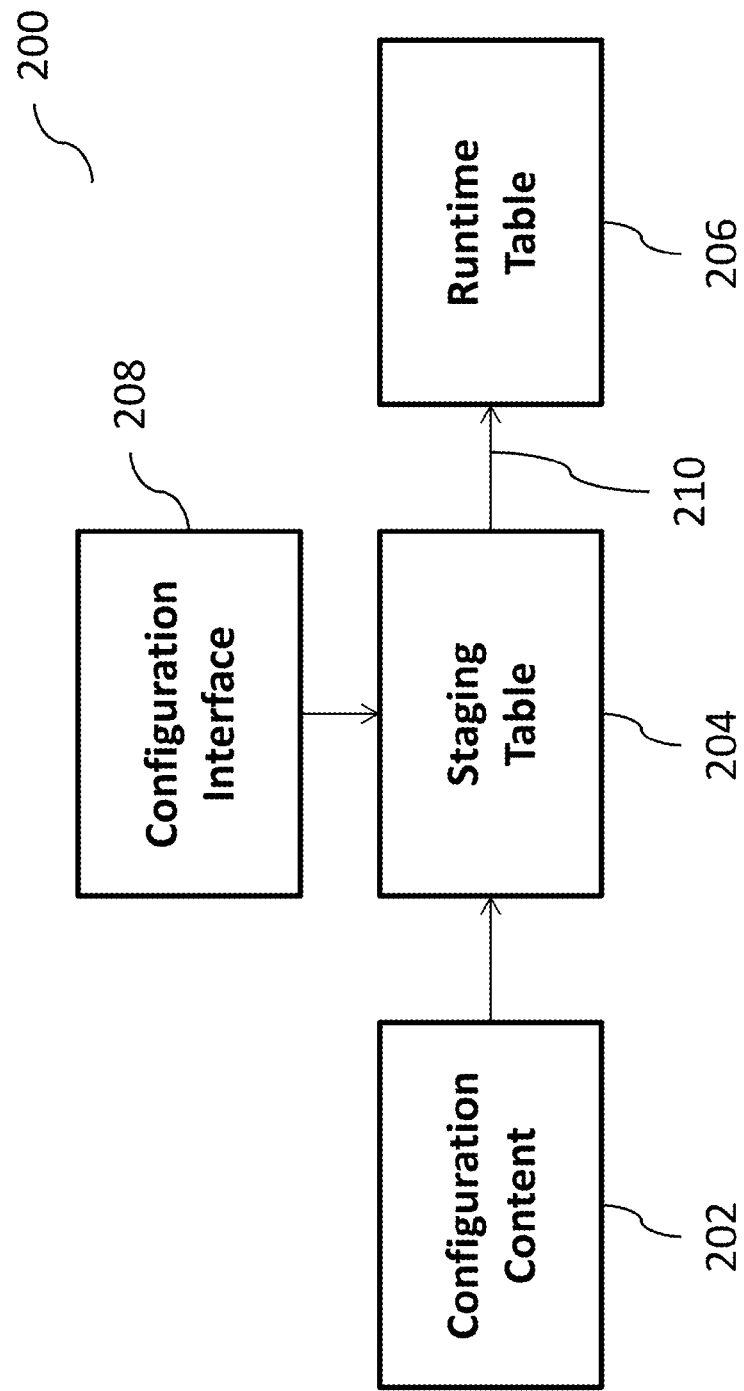
FIG. 2 illustrates exemplary configuration system, according to some implementations of the current subject.

FIG. 2 illustrates exemplary configuration system 200, according to some implementations of the current subject. The system 200 can be implemented on the server 104 (shown in FIG. 1). The system can include a configuration content component 202, a staging table component 204, and a runtime table component 206. A configuration interface 208 can be generated by the server 104 (shown in FIG. 1) and can be provided to the user 102 of the application. The interface 208 can also be provided to any other business objects, business processes, business process applications, and/or any other users.

The configuration content 202 can be provided by the HANA system 106 (shown in FIG. 1) and can be supplied to the configuration table 204. Once the user configures the application using the interface 208, a runtime table 206 can be generated to configure an application. Configuration information can be imported to the staging table 204 for the purposes of configuring an application. In some implementations, the configuration content can be delivered using a comma separated values ("CSV") format and configuration files can be imported using an HDBTI format, which can be a table-import configuration format that can specify which .csv file is imported into which table in the HANA system 106. Configuration content (e.g., values for statuses, possible status transitions, etc.) can be used for business validations in the backend of a system, can be consumed by application clients (e.g. to fill dropdown values, etc.), and/or for any other purposes.

The staging table 204 can include content that can be persisted after import of an application and/or when configuration of the application has been changed. The content can come from a company providing the application and/or configuration content (e.g., SAP SE, Walldorf, Germany), any third party content (e.g., a partner content), and/or user content. The staging table 204 can contain same columns as the runtime table 206 as well as an additional key field that can identify a source package of table entries in the staging table 204. The runtime table 206 can define runtime settings of the application and can be used by the runtime code of the application.

The runtime table 206 can be generated based on the staging table 204 using an activation mechanism 210 that can populate the runtime table 206 using staging table 204 content. The activation mechanism 210 can also check configuration consistency prior to populating the runtime table 206. This approach can allow changing content and/or checking of consistency prior to configuration becoming active, thereby preventing inconsistency.

In some implementations, the system 200 can use a predetermined package name format for separating content originating from the company, partners, and/or users. The package name can also identify location of where each such content can be stored and/or where it is being used.

In some implementations, the runtime table 206 can include a key field which can include a package name prefix and a logical key (e.g., the package name prefix and the logical key can be separated by a period, as shown in FIG. 4). At runtime, this can allow distinguishing between the user, the partner and the company values. Some of these values can have the same logical key, but can have separate semantics. In some implementations, in order to avoid users and/or partners from overwriting each other's keys, a particular order/priority and/or layering of keys can be used. FIG. 3 illustrates an exemplary table 300 identifying hierarchy or layering of packages that can be originating from a company providing the application, a third party (e.g., a partner), and a user, according some implementations of the current subject matter. The table 300 can include more or fewer entries depending on a number of layers that may be involved in the package layering. In some implementations, settings of packages in higher layer can overwrite settings of packages in a lower layer. This means that package settings of a packages originating from a company (layer "0") can be overwritten by a partner1 package settings (layer "1") and or customer package settings (layer "2"), as shown in FIG. 3.

FIG. 4 illustrates exemplary staging table 410 and runtime table 420, according to some implementations of the current subject matter. The runtime table 420 can include three columns: a code column ("CODE") and two columns ("COLUMN_1" and "COLUMN_2") associated with a configuration content code that is being imported. The staging table 410 can include same columns as the runtime table 42 in addition to a column that includes a package identifier ("PACKAGE_ID"), which can describe the package as well as where a specific staging table entry is originating (e.g., the package where the CSV file and the HDBTI originate).

For example, when activating the staging table 410, the entry partner/company.CODE_1 can override the entry company/company.CODE_1 as the package "partner1" has a higher layer assigned than package "company" (as shown in FIG. 3). The values "A" and "B" in COLUMN_1 and COLUMN_2 of staging table 410 corresponding to PACKAGE ID company and CODE company.CODE_1 are overwritten in the runtime table 420 with values "Q" and "W", respectively from the partner1 PACKAGE_ID column, CODE company.CODE_1. In some implementations, various rules can be generated as to when package settings can be overwritten and/or when they cannot be overwritten. This can prevent overwriting settings that may cause operation failure of a system and/or an application being configured.

In some implementations, the staging table 410 and the runtime table 420 can be represented as application object framework objects. These objects can be used as a target for foreign keys used from standard AOF objects. Staging objects can be used to maintain configuration from the configuration interface (i.e., configuration interface 202 shown in FIG. 2) and can be treated as application objects. An exemplary application object framework is discussed below (as well as described in co-owned, co-pending U.S. patent application Ser. No. 14/689,920, entitled "Application Object Framework", now U.S. Pat. No. 9,600,299, issued Mar. 21, 2017, the disclosure of which is incorporated herein by reference in its entirety).

Figure 5:
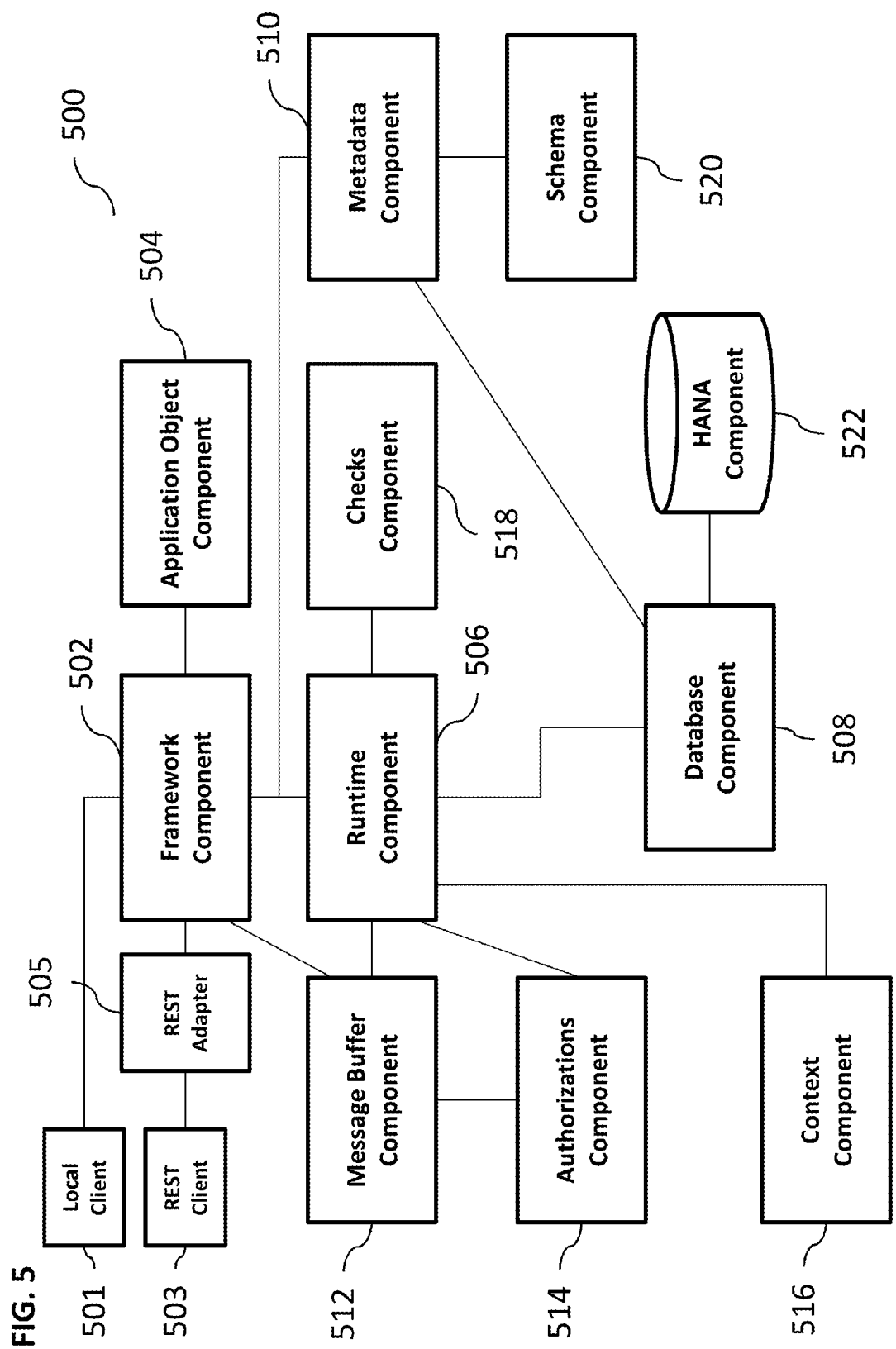
FIG. 5 illustrates exemplary application object framework architecture, according to some implementations of the current subject matter.

FIG. 5 illustrates exemplary application object framework architecture 500, according to some implementations of the current subject matter. The AOF framework 500 included in the HANA system 106 (as shown in FIG. 1) and can include a framework component 502, an application object component 504, a runtime component 506, a database component 508, a metadata component 510, a message buffer component 512, an authorizations component 514, a context component 516, a checks component 518, a schema component 520, and a HANA component 522. The architecture 500 can be accessed by a local client 501 and a representational state transfer ("REST") client 503 via an adapter 505. The local client 501 can access the framework component 502 of the system 500 directly. The local client 501 can be a business object, a business process, an application, a user and/or any other client. The REST client 503 can access the framework component 502 via the adapter 505 and using any available protocols, such as a hypertext transfer protocol ("HTTP"). The REST client 503 can be a business object, a business process, an application, a user and/or any other client. In some implementations, the differences between clients 501 and 503 can be in the way how the clients access the system 500 and in particular the framework component 502.

The framework component 502 can be a central point of entry into the system 500 and can provide a buffered application object interface for an application object name, allowing access to runtime component 506. Once the client (client 501 and/or 503) has accessed the framework component 502, the framework component 502 can request the application object component 504 to load a library corresponding to the application object, including its definition, structure, attributes, actions, checks, determinations, etc. The framework component 502 can also request the metadata component 510 to load a corresponding metadata that can be associated with the application object. The metadata component 510 can also obtain an appropriate metadata schema from the schema component 520, which can provide information about metadata definitions associated with the application object. The framework component 502 can also obtain information about transaction(s) that can use the application object. In response to the access by the client, the framework component 502 can return a runtime access interface to the client (client 501 and/or client 503), which can include metadata definition(s).

In some implementations, a runtime interface can be provided by the runtime component 506. The runtime component 506 can execute various application object operations, which can include create, read, update, and/or delete operations ("CRUD") as well as any other methods and/or custom actions. During creation of the runtime interface, application object definition(s) can be loaded from a library file, which can be obtained from the application object component 504. The application object definition(s) can be obtained based on the application object name, which can contain a package name (corresponding to a software package that can contain the application object) and/or an object name (corresponding to the application object). The runtime component 506 can also request the checks component 518 to perform various checks on the information obtained about the application object. The checks component 518 can perform checks of attribute(s), foreign key(s), etc. associated with the application object to determine whether or not such attribute(s), foreign key(s), etc. are valid. If the attribute(s), foreign key(s), etc. are not valid, an appropriate error message can be generated and returned to the client. The error message can be stored in the message buffer component 512.

Additionally, the runtime component 506 and the framework component 502 can access the message buffer component 512 to add message(s) and/or obtain message(s) associated with the application object. The operation of the message buffer component 512 is discussed in further detail below.

In some implementations, during generation of a runtime interface for the client, the runtime component 506 can request the authorizations component 514 to perform one or more authorizations associated with the application object. The authorizations can include at least one of the following: checking instance access for the application object, checking parent instance access of a parent object of the application object (in some implementations, the objects can be stored in a hierarchical and/or tree like structure in a memory location). The authorization component 514 can also perform various other checks on the application object.

The runtime component 506 can also access the context component 516 to obtain various context that can be associated with the application object. The context can include at least one of the following: user information, action(s) associated with the application object, timestamp(s) that may be requested when the application was accessed, modified, etc., as well any other information. In some implementations, the context component 516 can also provide at least one of the following: current context, such as a database-connection, current application user, current operation and/or request timestamp. The application object framework can be exposed as REST protocol using the REST adapter 505.

In some implementations, the runtime object 506 can also provide information for storage in the HANA component 522 via the database component 508. An exemplary HANA component is discussed below in connection with FIGS. 9-10. The database component 508 can store various updates that may have been performed by the runtime component 506 as a result of the CRUD operations and/or any other custom operations. The database component 508 can also update metadata definitions (e.g., table metadata tables) associated with the application object as well as perform various other operations.

In some implementations, once a metadata definition for the application object is loaded from the metadata component 510, the framework component 502 can return a runtime access interface to the client, including the metadata definition provided by the metadata component 510. Application object operations in the runtime component 506 can be executed according to the exemplary sequence discussed below.

Figure 6:
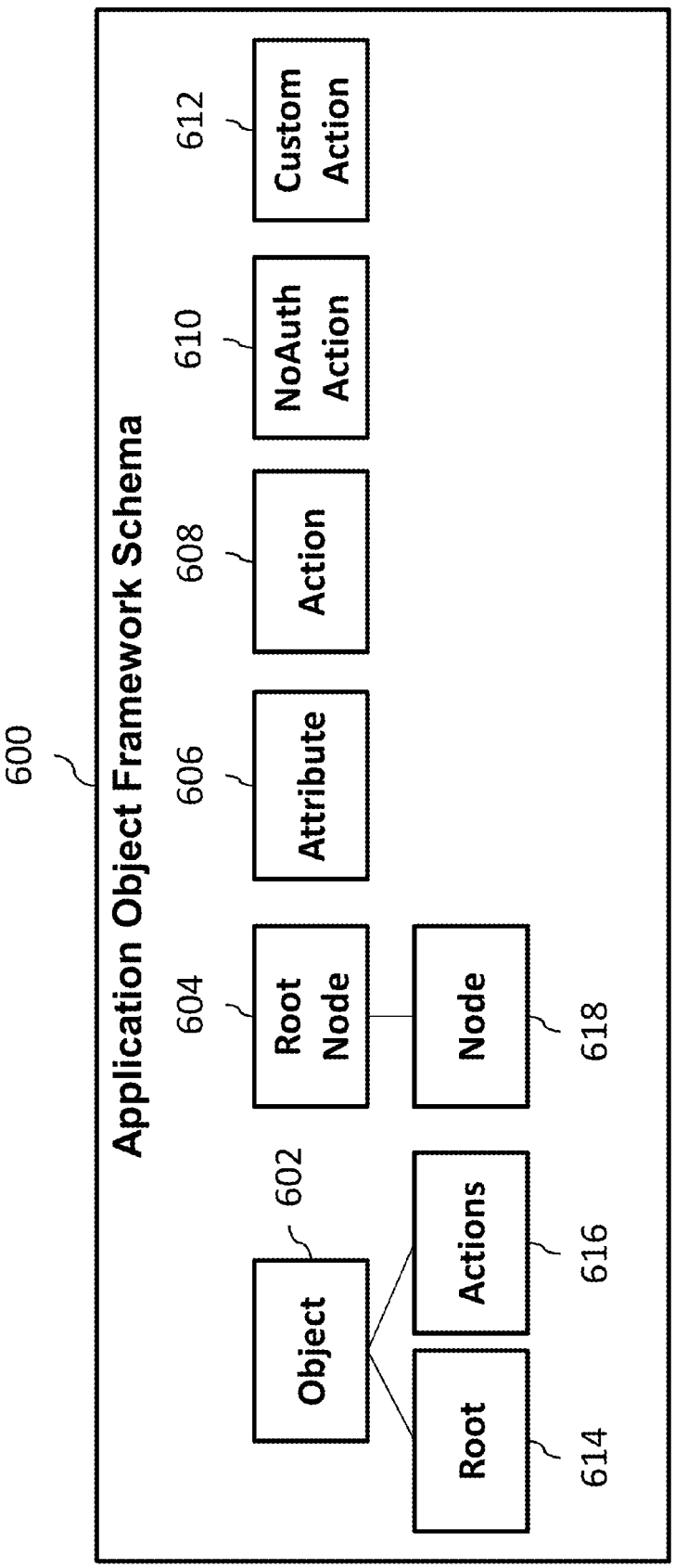
FIG. 6 illustrates an exemplary schema that can be used for the application object's definition, according to some implementations of the current subject matter.

In some implementations, the application object's definition can follow a particular application object framework schema. FIG. 6 illustrates an exemplary schema 600 that can be used for the application object's definition, according to some implementations of the current subject matter. The schema 600 can include an object level 602, a root node level 604, an attribute level 606, an action level 608, a non-authorized action level 610, and a custom action level 612. The schema 600 can implement at least one of the following Javascript types (having the indicated values): Structure: "Javascript Object" value, Array: "Javascript Array" value, Function: "Javascript Function" value, String: "String" value, Boolean: "Boolean" value, Number: "Number" value, False: "Boolean and False" value, and Null: "Null" value.

The object level 602 can be a top level of the application object definition. It can include a type, which can be a structure corresponding to a Javascript object, and a definition. The definition can include a root 614 and actions 616.

The root 604 can contain definition of the application object root. It can include a true value (which might be a required property in the definition) and a type of a Root-Node, which can be a definition check that is performed against schema RootNode. The actions 616 can define application object actions (which might be a required property in the actions 616). The Javascript type of the actions can be Structure (i.e., Javascript Object). The actions 616 can include constraints, which can define various listed constraints (including their listed properties) and how they can be implemented. The constraints can be required, optional, forbidden, and/or generic.

The required constraints can include various actions. Exemplary actions can include at least one of the following: "create" (e.g., create operation of the application object, having a Javascript type: Action (performing a definition check against schema Action)), "update" (e.g., update operation of the application object), "delete" (e.g., delete operation of the application object), "read" (e.g., read operation of the application object), etc.

The optional constraints can include listed properties that can be allowed but that can be optional. Further, some constraints can be forbidden, i.e., listed properties that might not be allowed (e.g., a keyword is protected). Additionally, constraints can also be generic, whereby generic property definitions can be allowed and defined by an unknown name. These properties can perform a definition check against a particular customer action schema.

In some implementations, the schema 600 can include nodes (e.g., node 618), which can define an application object node. The nodes can be part of a structure of the scheme 600. The node can include at least one of the following: a table, a sequence, a history table, a parent key, read only property, a check, an attribute, and any other type of node property. The table can specify a persistence table for the application object node and have a type of a string (i.e., a definition check can be performed against string). The sequence can specify a sequence for the application object node. The history table can specify a persistence history table for the application object node. The parent key can specify a parent key table field for sub-nodes. The read only property can specify if a node (including attributes) is modifiable externally. The read-only property can be a Boolean parameter, a function, and/or a null value. The check property can refer to consistency checks that can be performed on a node after a modification. The check property can be an array function. The attribute can specify attribute properties merged with metadata derived from the table definition. Other node properties can specify sub-nodes of the current node.

In some implementations, the schema 600 can include a root node (e.g., root node 604), which can provide a definition of an application object root node. The root node definition can include a determinations property. The determinations property can specify determinations executed after application object modifications. The determinations property can include various constraints, which can be at least one of the following: an on-create constraint, an on-update constraint, and an on-modify constraint. These constraints can be array functions. The on-create constraint can specify determinations executed after application object creation. The on-update constraint can specify determinations executed after application object update. The on-modify constraint can specify determinations executed after application object creation or update.

In some implementations, the schema 600 can include an attribute 606 component, which can be a definition of an application object node attribute. The attributes can include at least one of the following: a required attribute (i.e., specifying that the attribute is mandatory), a foreign key attribute (i.e., specifying the application object name, the attribute value is a foreign key), a constant key attribute (i.e., specifying that a constant key the attribute is a default with and which is used during read for selection), a read only attribute (i.e., specifying that the attribute is read only and not modifiable externally), and a checks attribute (i.e., specifying consistency checks on attribute after modifications).

In some implementations, the schema 600 can include an action component 608, which can define an application object action. The action 608 can include at least one of the following: a check authorization action (i.e., specifying an authorization check for the action), a check enabled action (i.e., specifying an enabled check for the action), and a history event action (i.e., specifying a history event name for the history table entry).

In some implementations, the schema 600 can include a no-authorization action component 610, which can define an application object action with no authorization check. This component can include a check authorization action, which can indicate that check authorization is not allowed.

In some implementations, the schema 600 can include a custom action 612 component, which can define an application object action with no authorization check. The action 612 can include execute action that can specify an execution logic of the custom action.

Figure 7:
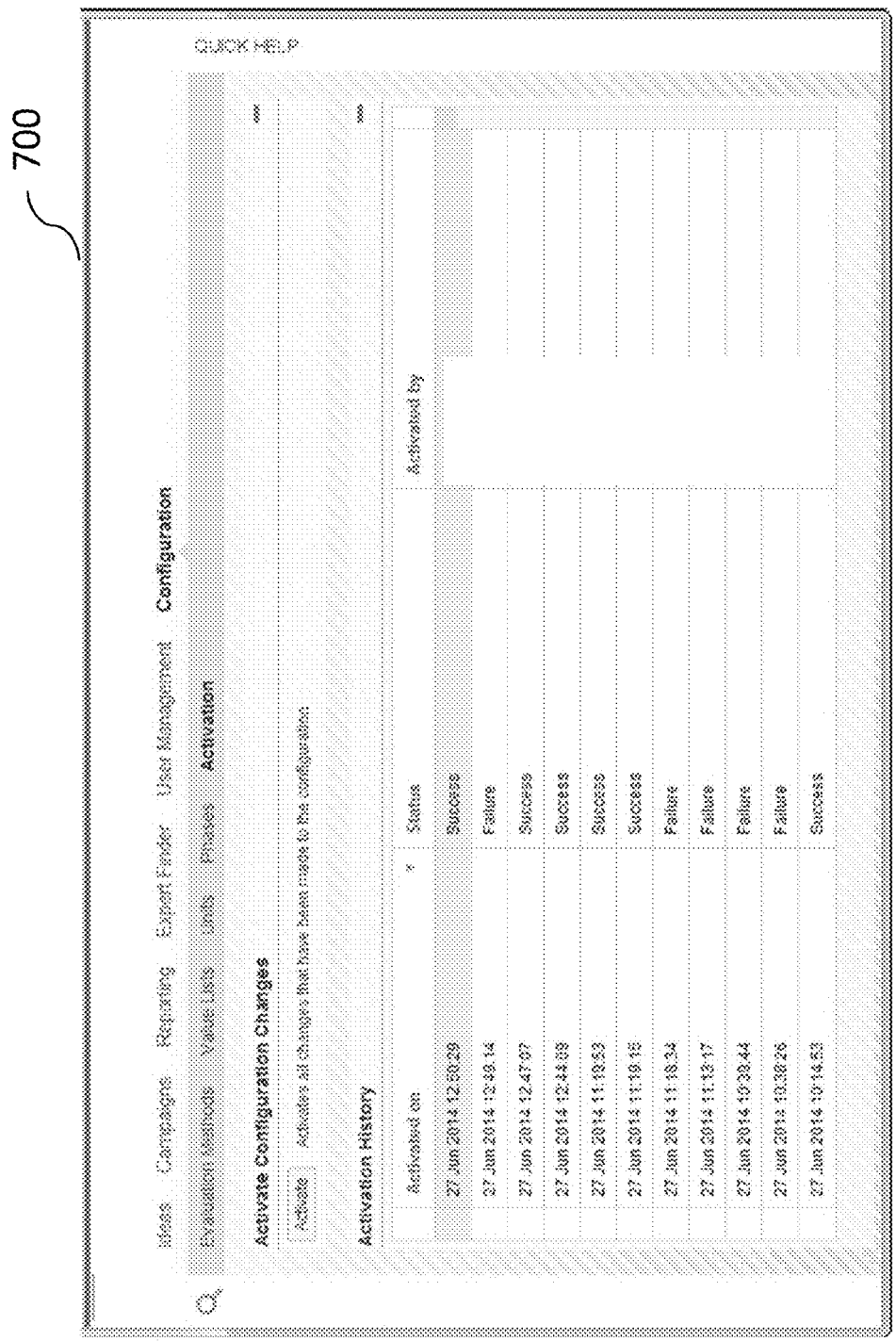
FIG. 7 illustrates an exemplary configuration activation interface, according to some implementations of the current subject matter.

Referring back to FIG. 2, activation of the configuration content in the staging table 204 can be performed by the activation mechanism 210 upon completion of the configuration data. The activation of the configuration content can be based on metadata of the AOF configuration objects (e.g., foreign key relations). In some implementations, activation checks can also be provided by the staging application object framework objects. Further, in some implementations, after system installation and/or configuration import, activation can be triggered by an external service call. FIG. 7 illustrates an exemplary configuration activation interface 700, according to some implementations of the current subject matter.

Figure 8:
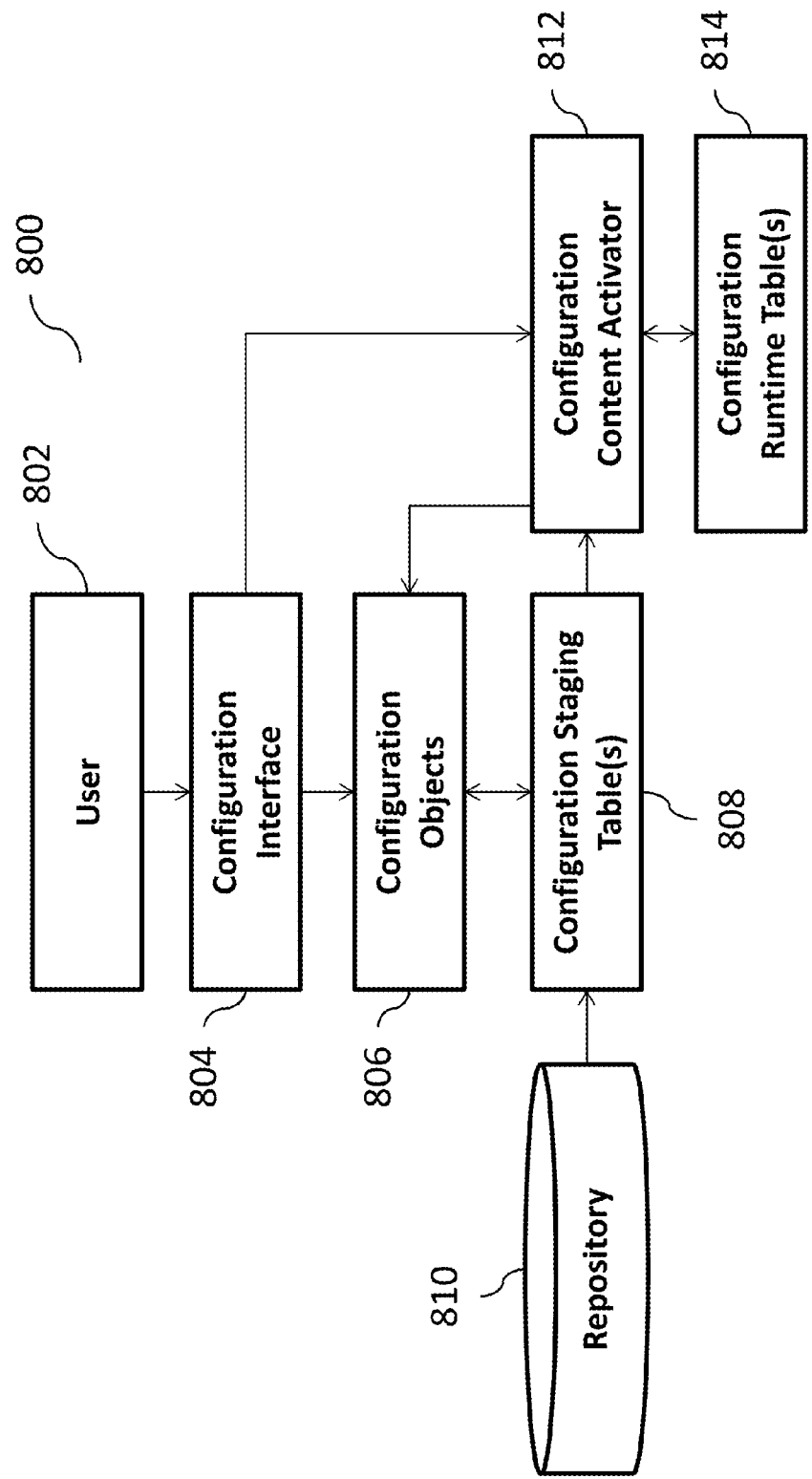
FIG. 8 illustrates an exemplary configuration system, according to some implementations of the current subject matter.

FIG. 8 illustrates an exemplary configuration system 800, according to some implementations of the current subject matter. The server 104 (shown in FIG. 1) can incorporate one or more components of the system 800. The system 800 can include a configuration interface component 804 that can be accessed by a user 802 to perform configuration of a computing system (e.g., a software application, a business object, a business process, a business process application, and/or any other objects, applications, data, etc.). The configuration interface 804 can be any user interface that can be built on top of application object framework staging objects. The system 800 can further include configuration objects component 806 that can be supplied to a catalog containing configuration staging tables 808, a repository 810 that can include various configuration content (e.g., .CSV files, .HDBTI files, etc.), a configuration content activator 812, and a catalog of configuration runtime table component 814.

The content contained in the repository 810 can similar to the configuration content 202 (shown in FIG. 2), which can be provided to the configuration staging table component 808 for inclusion into the staging tables. The configuration staging tables 808 can be similar to the staging tables 204 discussed in connection with FIG. 2.

Once the staging tables are populated with configuration content, the configuration content activator 812 can perform activation of the content for supplying it to the configuration runtime tables component 814 for placement into runtime tables. The configuration content activator component 812 can also perform various activation checks using configuration objects 806 prior to supplying content to the component 814. In some implementations, the configuration interface 804 can access the configuration content activator 812 to perform various configuration functions. Once the configuration runtime tables are populated with information, the configuration of the computing system can be performed.

In some implementations, the current subject matter can be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, can interact with the in-memory system for the purposes of accessing data, for example. Other systems and/or combinations of systems can be used for implementations of the current subject matter. The following is a discussion of an exemplary in-memory system.

Figure 9:
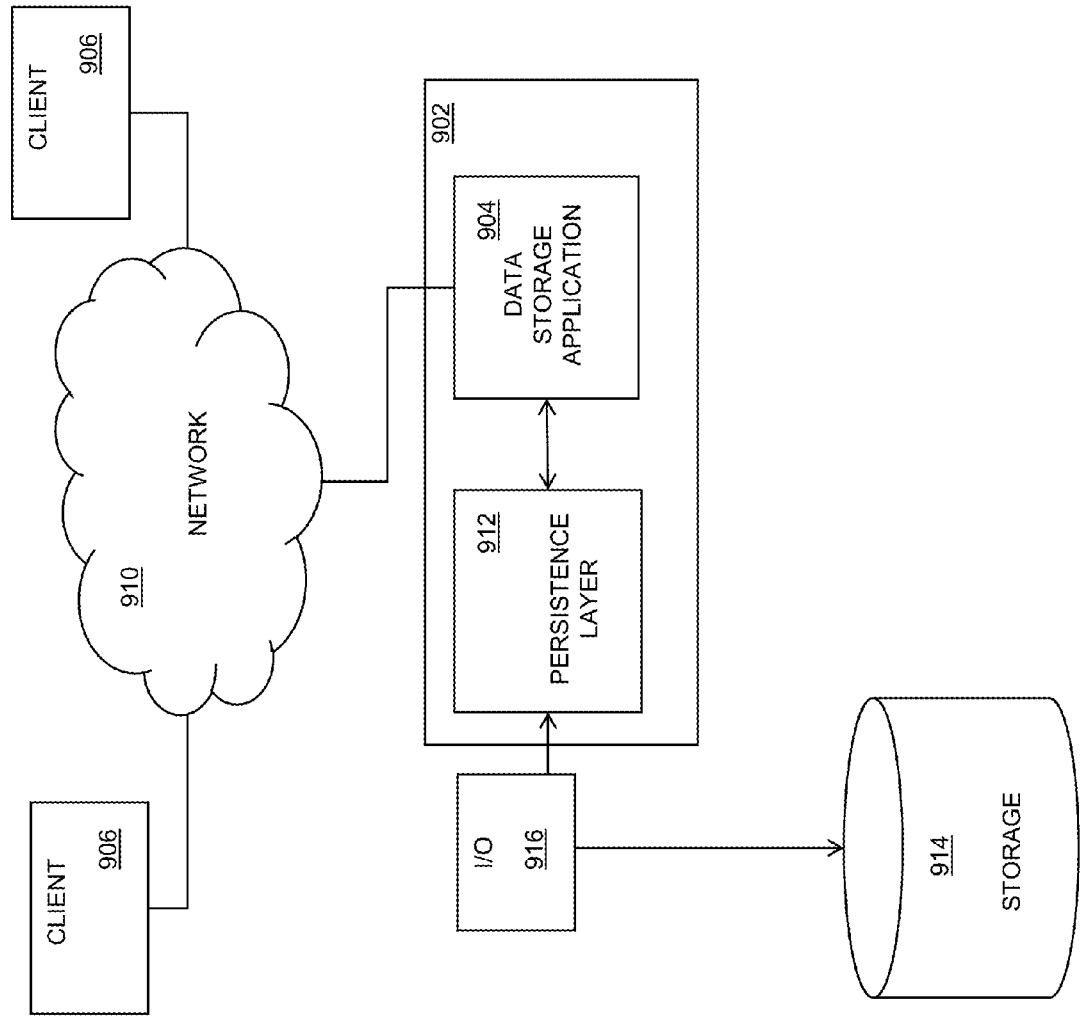
FIG. 9 is a diagram illustrating an exemplary system including a data storage application, according to some implementations of the current subject matter.

FIG. 9 illustrates an exemplary system 900 in which a computing system 902, which can include one or more programmable processors that can be collocated, linked over one or more networks, etc., executes one or more modules, software components, or the like of a data storage application 904, according to some implementations of the current subject matter. The data storage application 904 can include one or more of a database, an enterprise resource program, a distributed storage system (e.g. NetApp Filer available from NetApp of Sunnyvale, Calif.), or the like.

The one or more modules, software components, or the like can be accessible to local users of the computing system 902 as well as to remote users accessing the computing system 902 from one or more client machines 906 over a network connection 910. One or more user interface screens produced by the one or more first modules can be displayed to a user, either via a local display or via a display associated with one of the client machines 906. Data units of the data storage application 904 can be transiently stored in a persistence layer 912 (e.g., a page buffer or other type of temporary persistency layer), which can write the data, in the form of storage pages, to one or more storages 914, for example via an input/output component 916. The one or more storages 914 can include one or more physical storage media or devices (e.g. hard disk drives, persistent flash memory, random access memory, optical media, magnetic media, and the like) configured for writing data for longer term storage. It should be noted that the storage 914 and the input/output component 916 can be included in the computing system 902 despite their being shown as external to the computing system 902 in FIG. 9.

Data retained at the longer term storage 914 can be organized in pages, each of which has allocated to it a defined amount of storage space. In some implementations, the amount of storage space allocated to each page can be constant and fixed. However, other implementations in which the amount of storage space allocated to each page can vary are also within the scope of the current subject matter.

Figure 10:
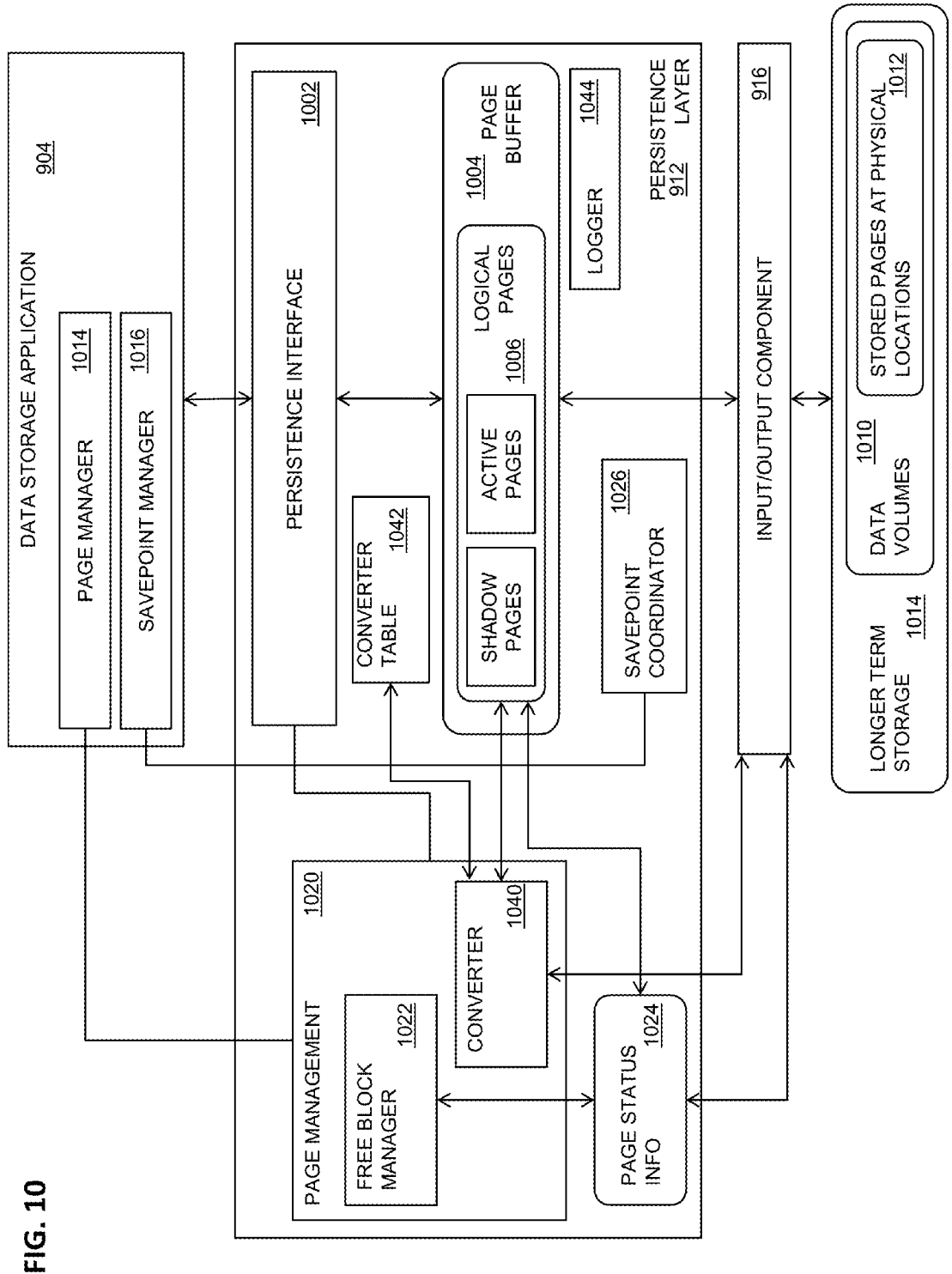
FIG. 10 is a diagram illustrating details of the system of FIG. 9.

FIG. 10 illustrates exemplary software architecture 1000, according to some implementations of the current subject matter. A data storage application 904, which can be implemented in one or more of hardware and software, can include one or more of a database application, a network-attached storage system, or the like. According to at least some implementations of the current subject matter, such a data storage application 904 can include or otherwise interface with a persistence layer 912 or other type of memory buffer, for example via a persistence interface 1002. A page buffer 1004 within the persistence layer 912 can store one or more logical pages 1006, and optionally can include shadow pages, active pages, and the like. The logical pages 1006 retained in the persistence layer 912 can be written to a storage (e.g. a longer term storage, etc.) 914 via an input/output component 916, which can be a software module, a sub-system implemented in one or more of software and hardware, or the like. The storage 914 can include one or more data volumes 1010 where stored pages 1012 are allocated at physical memory blocks.

In some implementations, the data storage application 904 can include or be otherwise in communication with a page manager 1014 and/or a savepoint manager 1016. The page manager 1014 can communicate with a page management module 1020 at the persistence layer 912 that can include a free block manager 1022 that monitors page status information 1024, for example the status of physical pages within the storage 914 and logical pages in the persistence layer 912 (and optionally in the page buffer 1004). The savepoint manager 1016 can communicate with a savepoint coordinator 1026 at the persistence layer 912 to handle savepoints, which are used to create a consistent persistent state of the database for restart after a possible crash.

In some implementations of a data storage application 904, the page management module of the persistence layer 912 can implement a shadow paging. The free block manager 1022 within the page management module 1020 can maintain the status of physical pages. The page buffer 1004 can include a fixed page status buffer that operates as discussed herein. A converter component 1040, which can be part of or in communication with the page management module 1020, can be responsible for mapping between logical and physical pages written to the storage 914. The converter 1040 can maintain the current mapping of logical pages to the corresponding physical pages in a converter table 1042. The converter 1040 can maintain a current mapping of logical pages 1006 to the corresponding physical pages in one or more converter tables 1042. When a logical page 1006 is read from storage 914, the storage page to be loaded can be looked up from the one or more converter tables 1042 using the converter 1040. When a logical page is written to storage 914 the first time after a savepoint, a new free physical page is assigned to the logical page. The free block manager 1022 marks the new physical page as "used" and the new mapping is stored in the one or more converter tables 1042.

The persistence layer 912 can ensure that changes made in the data storage application 904 are durable and that the data storage application 904 can be restored to a most recent committed state after a restart. Writing data to the storage 914 need not be synchronized with the end of the writing transaction. As such, uncommitted changes can be written to disk and committed changes may not yet be written to disk when a writing transaction is finished. After a system crash, changes made by transactions that were not finished can be rolled back. Changes occurring by already committed transactions should not be lost in this process. A logger component 1044 can also be included to store the changes made to the data of the data storage application in a linear log. The logger component 1044 can be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations can occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information can be written by the logger component 1044 whenever a change is made. This information can be written to disk at latest when the transaction ends. The log entries can be persisted in separate log volumes while normal data is written to data volumes. With a redo log, committed changes can be restored even if the corresponding data pages were not written to disk. For undoing uncommitted changes, the persistence layer 912 can use a combination of undo log entries (from one or more logs) and shadow paging.

The persistence interface 1002 can handle read and write requests of stores (e.g., in-memory stores, etc.). The persistence interface 1002 can also provide write methods for writing data both with logging and without logging. If the logged write operations are used, the persistence interface 1002 invokes the logger 1044. In addition, the logger 1044 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 1044. For an entry of type "update", for example, this would be the identification of the affected record and the after image of the modified data.

When the data application 904 is restarted, the log entries need to be processed. To speed up this process the redo log is not always processed from the beginning Instead, as stated above, savepoints can be periodically performed that write all changes to disk that were made (e.g., in memory, etc.) since the last savepoint. When starting up the system, only the logs created after the last savepoint need to be processed. After the next backup operation the old log entries before the savepoint position can be removed.

When the logger 1044 is invoked for writing log entries, it does not immediately write to disk. Instead it can put the log entries into a log queue in memory. The entries in the log queue can be written to disk at the latest when the corresponding transaction is finished (committed or aborted). To guarantee that the committed changes are not lost, the commit operation is not successfully finished before the corresponding log entries are flushed to disk. Writing log queue entries to disk can also be triggered by other events, for example when log queue pages are full or when a savepoint is performed.

With the current subject matter, the logger 1044 can write a database log (or simply referred to herein as a "log") sequentially into a memory buffer in natural order (e.g., sequential order, etc.). If several physical hard disks/storage devices are used to store log data, several log partitions can be defined. Thereafter, the logger 1044 (which as stated above acts to generate and organize log data) can load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers can be reordered from log segments of all partitions during recovery to the proper order.

As stated above, the data storage application 904 can use shadow paging so that the savepoint manager 1016 can write a transactionally-consistent savepoint. With such an arrangement, a data backup comprises a copy of all data pages contained in a particular savepoint, which was done as the first step of the data backup process. The current subject matter can be also applied to other types of data page storage.

Figure 11:
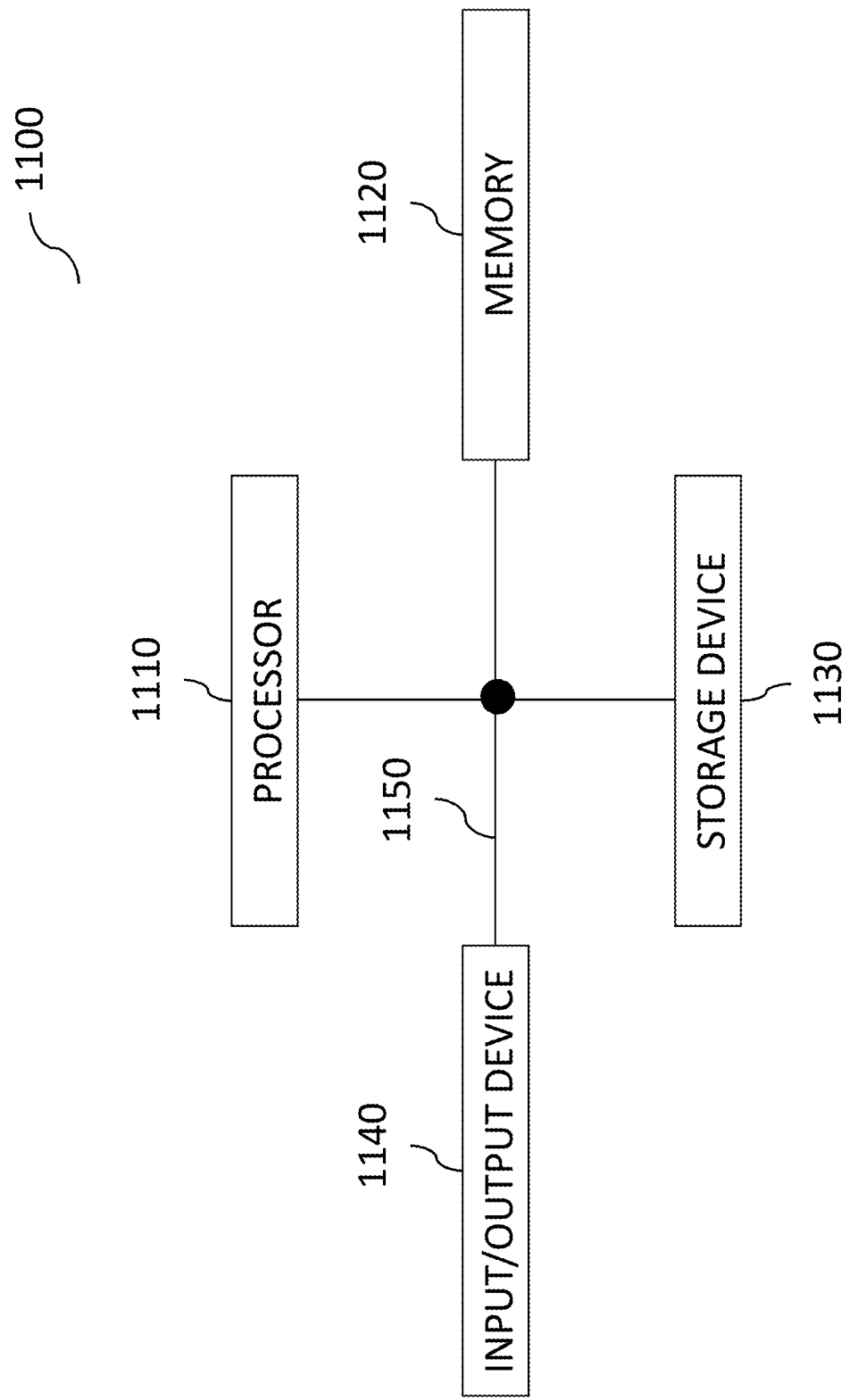
FIG. 11 illustrates an exemplary system, according to some implementations of the current subject matter.

In some implementations, the current subject matter can be configured to be implemented in a system 1100, as shown in FIG. 11. The system 1100 can include a processor 1110, a memory 1120, a storage device 1130, and an input/output device 1140. Each of the components 1110, 1120, 1130 and 1140 can be interconnected using a system bus 1150. The processor 1110 can be configured to process instructions for execution within the system 1100. In some implementations, the processor 1110 can be a single-threaded processor. In alternate implementations, the processor 1110 can be a multi-threaded processor. The processor 1110 can be further configured to process instructions stored in the memory 1120 or on the storage device 1130, including receiving or sending information through the input/output device 1140. The memory 1120 can store information within the system 1100. In some implementations, the memory 1120 can be a computer-readable medium. In alternate implementations, the memory 1120 can be a volatile memory unit. In yet some implementations, the memory 1120 can be a non-volatile memory unit. The storage device 1130 can be capable of providing mass storage for the system 1100. In some implementations, the storage device 1130 can be a computer-readable medium. In alternate implementations, the storage device 1130 can be a floppy disk device, a hard disk device, an optical disk device, a tape device, non-volatile solid state memory, or any other type of storage device. The input/output device 1140 can be configured to provide input/output operations for the system 1100. In some implementations, the input/output device 1140 can include a keyboard and/or pointing device. In alternate implementations, the input/output device 1140 can include a display unit for displaying graphical user interfaces.

Figure 12:
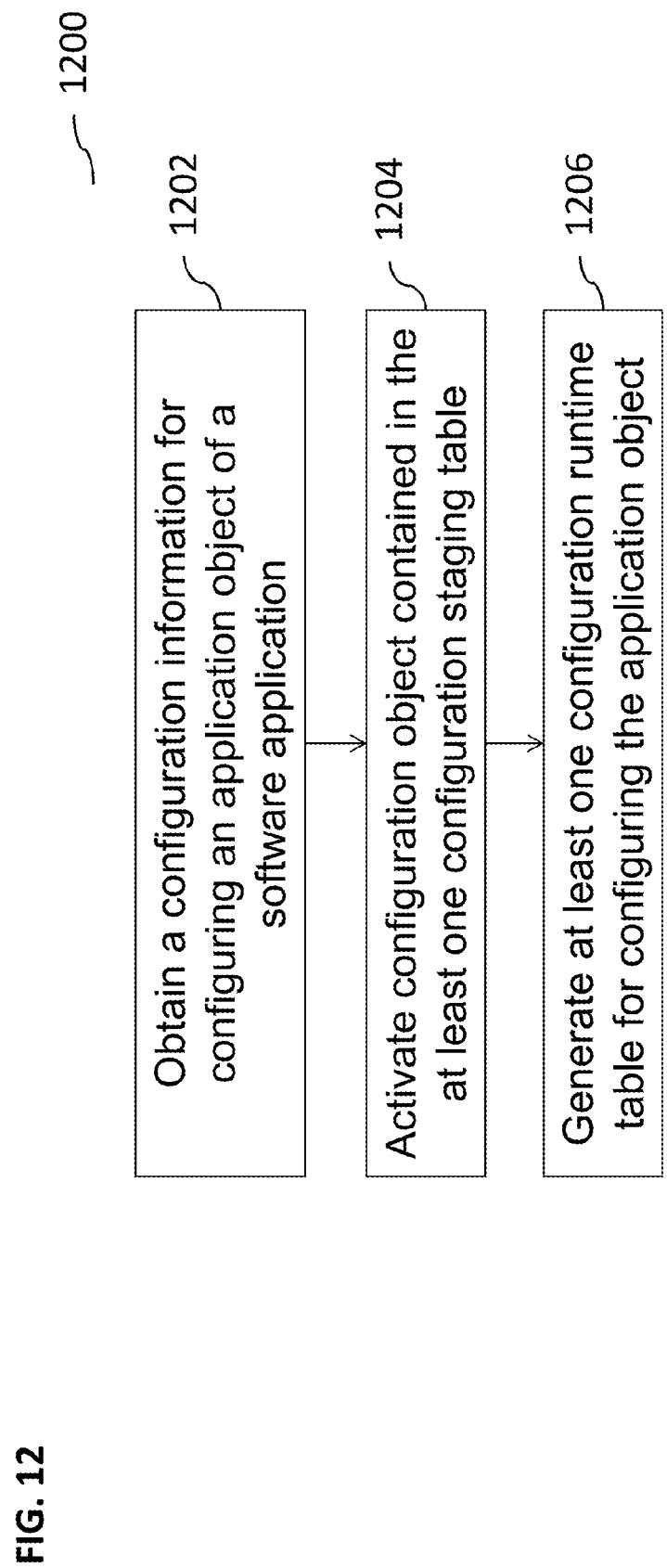
FIG. 12 illustrates an exemplary method, according to some implementations of the current subject matter.

FIG. 12 illustrates an exemplary method 1200, according to some implementations of the current subject matter. At 1202, configuration information for configuring an application object of a software application can be obtained. The configuration information can be arranged in at least one configuration staging table (e.g., staging table 204 as shown in FIG. 2). The configuration staging table can contain at least one configuration object. At 1204, the configuration object contained in the configuration staging table can be activated (e.g., using activation mechanism 210 shown in FIG. 2 or content activator 812 shown in FIG. 8). At 1206, a configuration runtime table (e.g., table 206 shown in FIG. 2) for configuring the application object can be generated based on the activated configuration object contained in the configuration staging table.

In some implementations, the current subject matter can include one or more of the following optional features. The configuration object can include identification of a plurality of sources of the configuration information. Each source in the plurality of source can contain at least one configuration setting for configuration of the application object. For example, a first source in the plurality of sources of the configuration information can contain a first configuration setting and a second source in the plurality of sources of the configuration information contains a second configuration setting information. The first configuration setting can overwrite the second configuration setting when performing configuration of the application object (as shown in FIG. 4).

In some implementations, the method can include performing a consistency check of the at least one configuration object.

In some implementations, the configuration object can be an application object framework object. The application object framework object can contain at least one persistent application object and at least one operation. The operations can include at least one of the following: a create operation, a read operation, an update operation, a delete operation, a custom action operation, an existence of action check operation, and an operation on at least one property of the application object. The application object framework object can be also characterized by at least one of the following: an object definition, a definition of an application object node, a definition of an application object root node, a definition of an application object node attribute, a definition of an application object action, and a definition of an application object authorization.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed is:

1. A computer-implemented method, comprising:
   obtaining a configuration information for configuring an application object of a software application, the configuration information being arranged in at least one configuration staging table, the at least one configuration staging table containing at least one configuration object;
   activating the at least one configuration object contained in the at least one configuration staging table, the at least one configuration staging table storing the configuration information in a predetermined format, the configuration information being used to perform at least one validation of the application object; and
   generating, based on the activated configuration object contained in the at least one configuration staging table, at least one configuration runtime table for configuring the application object, the at least one configuration runtime table including a hierarchically arranged plurality of logical keys, each logical key in the plurality of logical keys being associated with a configuration setting in a plurality of configuration settings and at least one rule determining when a first configuration setting in the plurality of configuration settings associated with a first logical key identifying a first source of configuration information origin and having a first configuration priority can overwrite second configuration setting in the plurality of configuration settings associated with a second logical key identifying a second source of configuration information origin and having a second configuration priority, wherein the first source is different from the second source;
   wherein at least one of the obtaining, the activating, and the generating is performed by at least one processor of at least one computing system.

2. The method according to claim 1, wherein the at least one configuration object includes identification of a plurality of sources of the configuration information, each source in the plurality of source containing at least one configuration setting for configuration of the application object.

3. The method according to claim 2, wherein the first source in the plurality of sources of the configuration information contains a first configuration setting and the second source in the plurality of sources of the configuration information contains a second configuration setting information, the first configuration setting overwriting the second configuration setting when performing configuration of the application object.

4. The method according to claim 1, further comprising performing a consistency check of the at least one configuration object.

5. The method according to claim 1, wherein the configuration object is an application object framework object, the application object framework object containing at least one persistent application object and at least one operation.

6. The method according to claim 5, wherein the operations include at least one of the following: a create operation, a read operation, an update operation, a delete operation, a custom action operation, an existence of action check operation, and an operation on at least one property of the application object.

7. The method according to claim 6, wherein the application object framework object is characterized by at least one of the following: an object definition, a definition of an application object node, a definition of an application object root node, a definition of an application object node attribute, a definition of an application object action, and a definition of an application object authorization.

8. A system comprising:
at least one programmable processor; and
a non-transitory machine-readable medium storing instructions that, when executed by the at least one programmable processor, cause the at least one programmable processor to perform operations comprising:
obtaining a configuration information for configuring an application object of a software application, the configuration information being arranged in at least one configuration staging table, the at least one configuration staging table containing at least one configuration object;
activating the at least one configuration object contained in the at least one configuration staging table, the at least one configuration staging table storing the configuration information in a predetermined format, the configuration information being used to perform at least one validation of the application object; and
generating, based on the activated configuration object contained in the at least one configuration staging table, at least one configuration runtime table for configuring the application object, the at least one configuration runtime table including a hierarchically arranged plurality of logical keys, each logical key in the plurality of logical keys being associated with a configuration setting in a plurality of configuration settings and at least one rule determining when a first configuration setting in the plurality of configuration settings associated with a first logical key identifying a first source of configuration information origin and having a first configuration priority can overwrite second configuration setting in the plurality of configuration settings associated with a second logical key identifying a second source of configuration information origin and having a second configuration priority, wherein the first source is different from the second source.

9. The system according to claim 8, wherein the at least one configuration object includes identification of a plurality of sources of the configuration information, each source in the plurality of source containing at least one configuration setting for configuration of the application object.

10. The system according to claim 9, wherein the first source in the plurality of sources of the configuration information contains a first configuration setting and the second source in the plurality of sources of the configuration information contains a second configuration setting information, the first configuration setting overwriting the second configuration setting when performing configuration of the application object.

11. The system according to claim 8, wherein the operations further comprise performing a consistency check of the at least one configuration object.

12. The system according to claim 8, wherein the configuration object is an application object framework object, the application object framework object containing at least one persistent application object and at least one operation.

13. The system according to claim 12, wherein the operations include at least one of the following: a create operation, a read operation, an update operation, a delete operation, a custom action operation, an existence of action check operation, and an operation on at least one property of the application object.

14. The system according to claim 13, wherein the application object framework object is characterized by at least one of the following: an object definition, a definition of an application object node, a definition of an application object root node, a definition of an application object node attribute, a definition of an application object action, and a definition of an application object authorization.

15. A computer program product comprising a non-transitory machine-readable medium storing instructions that, when executed by at least one programmable processor, cause the at least one programmable processor to perform operations comprising:
obtaining a configuration information for configuring an application object of a software application, the configuration information being arranged in at least one configuration staging table, the at least one configuration staging table containing at least one configuration object;
activating the at least one configuration object contained in the at least one configuration staging table, the at least one configuration staging table storing the configuration information in a predetermined format, the configuration information being used to perform at least one validation of the application object; and
generating, based on the activated configuration object contained in the at least one configuration staging table, at least one configuration runtime table for configuring the application object, the at least one configuration runtime table including a hierarchically arranged plurality of logical keys, each logical key in the plurality of logical keys being associated with a configuration setting in a plurality of configuration settings and at least one rule determining when a first configuration setting in the plurality of configuration settings associated with a first logical key identifying a first source of configuration information origin and having a first configuration priority can overwrite second configuration setting in the plurality of configuration settings associated with a second logical key identifying a second source of configuration information origin and having a second configuration priority, wherein the first source is different from the second source.

16. The computer program product according to claim 15, wherein the at least one configuration object includes identification of a plurality of sources of the configuration information, each source in the plurality of source containing at least one configuration setting for configuration of the application object.

17. The computer program product according to claim 16, wherein the first source in the plurality of sources of the configuration information contains a first configuration setting and the second source in the plurality of sources of the configuration information contains a second configuration setting information, the first configuration setting overwriting the second configuration setting when performing configuration of the application object.

18. The computer program product according to claim 15, wherein the operations further comprise performing a consistency check of the at least one configuration object.

19. The computer program product according to claim 15, wherein the configuration object is an application object framework object, the application object framework object containing at least one persistent application object and at least one operation.

20. The computer program product according to claim 19, wherein the operations include at least one of the following: a create operation, a read operation, an update operation, a delete operation, a custom action operation, an existence of action check operation, and an operation on at least one property of the application object.

* * * * *